United States Patent Office 3,351,854
Patented Nov. 7, 1967

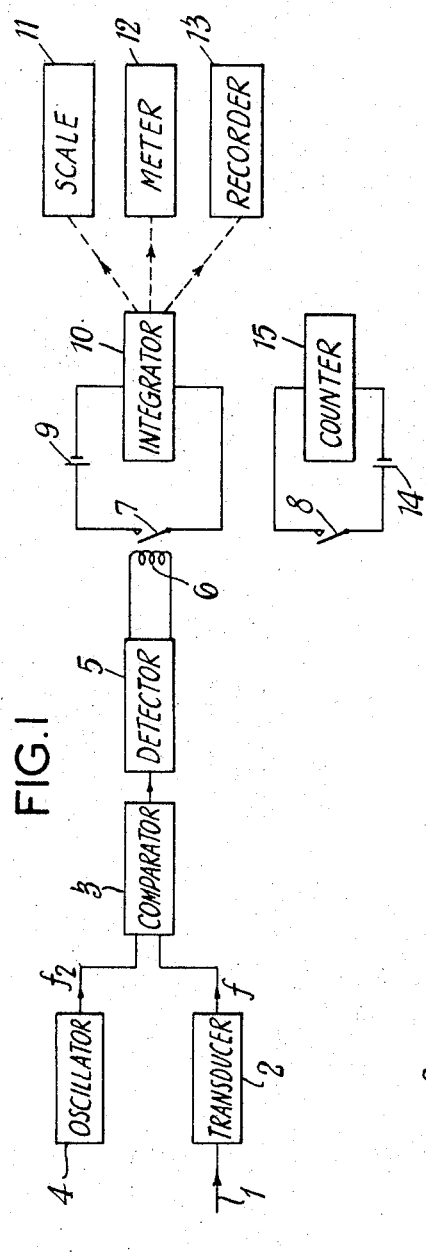
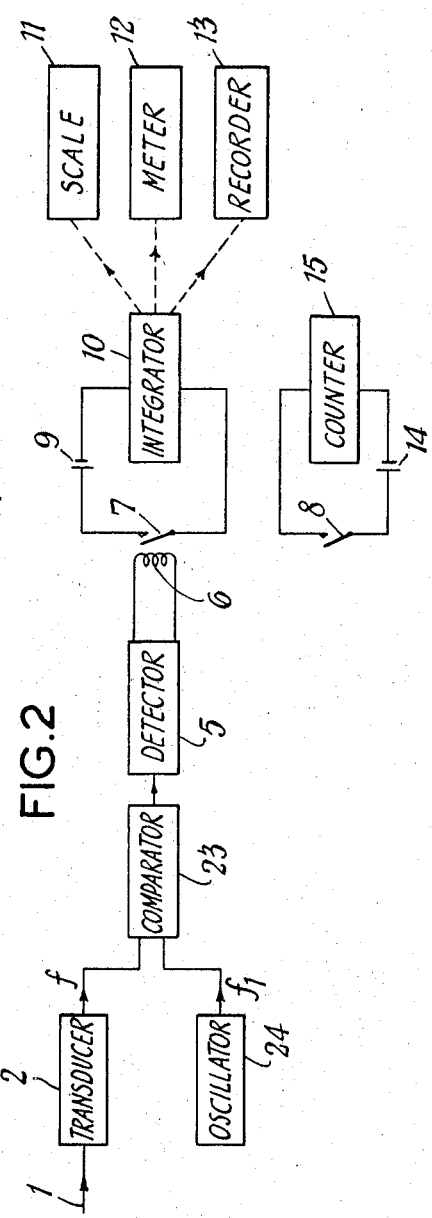

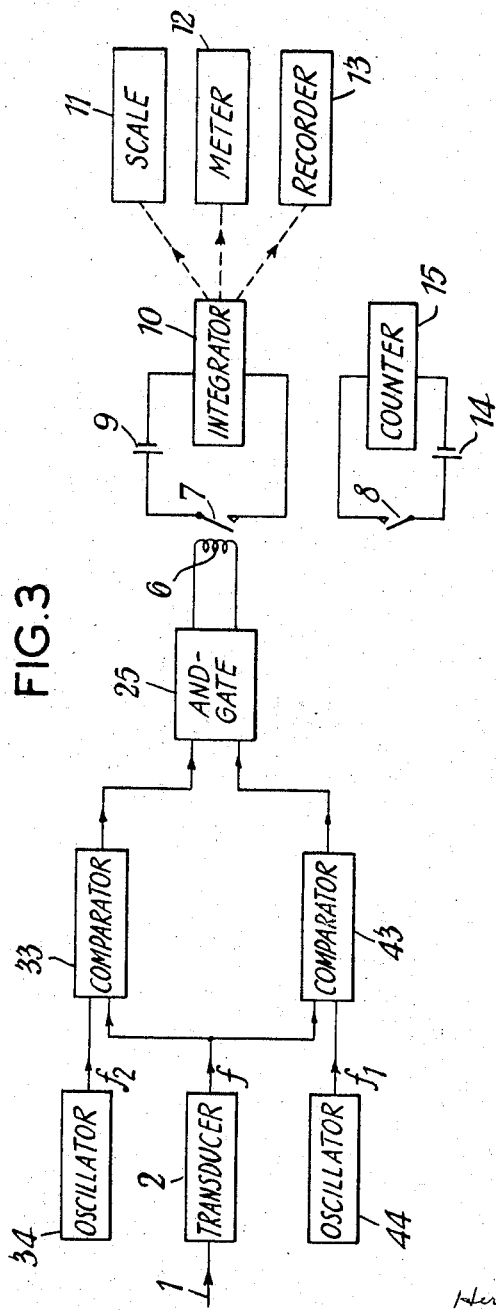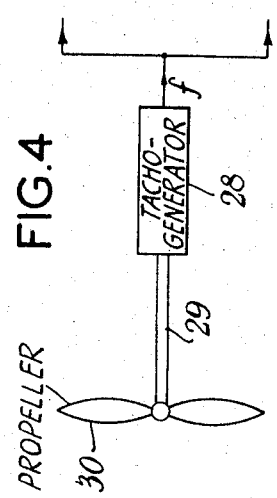

3,351,854
APPARATUS FOR DETERMINING THE ACCUMULATED LENGTH OF TIME A VARIABLE FREQUENCY INPUT SIGNAL IS WITHIN A PREDETERMINED RANGE
Herbert W. C. Sheen, Harpenden, and Leslie Bullock, Ware, England, assignors to Hawker Siddeley Dynamics Limited, Hatfield, England, a company of Great Britain
Filed Jan. 14, 1965, Ser. No. 425,516
Claims priority, application Great Britain, Jan. 20, 1964, 2,406/64
17 Claims. (Cl. 324—68)

This invention relates to elapsed-time indicators for measuring the accumulated time for which a variable quantity has a magnitude which lies within a predetermined range of magnitudes.

According to one aspect of the invention, there is provided an elapsed-time indicator for measuring the accumulated time for which an electrical input signal of variable frequency lies within a predetermined frequency-band bounded by a first predetermined frequency, the indicator including a first frequency comparator arranged to compare the variable frequency with the first predetermined frequency and to give a first electrical output signal when one of the variable frequency and the first predetermined frequency exceeds the other, and time-interval-responsive means responsive to the accumulated time for which the first electrical output signal persists.

According to a second aspect of the invention there is provided an elapsed-time indicator for measuring the accumulated time for which a variable quantity has a magnitude within a predetermined range of magnitudes bounded by a first limit, the indicator including transducer means for generating an electrical input signal of frequency variable as a function of the magnitude of the variable quantity, such that the variable frequency of the electrical input signal lies within a predetermined frequency-band bounded by a first predetermined frequency as the magnitude of the variable quantity varies within the predetermined range and such that the variable frequency otherwise does not lie within the predetermined frequency-band, and including a first frequency comparator arranged to compare the variable frequency with the first predetermined frequency and to give a first electrical output signal when one of the variable frequency and the first predetermined frequency exceeds the other, and time-interval-responsive means responsive to the accumulated time for which the first electrical output signal persists.

In one arrangement, the predetermined frequency-band lies between the first predetermined frequency and a higher frequency, and the first frequency comparator is arranged to give the first electrical output signal when the variable frequency exceeds the first predetermined frequency. In such case, the first frequency comparator may give no output signal when the variable frequency is less than the first predetermined frequency.

In another arrangement, the predetermined frequency-band lies between the first predetermined frequency and a lower frequency, and the first frequency comparator is arranged to give the first electrical output signal when the variable frequency is less than the first predetermined frequency. In such case, the first frequency comparator may give no output signal when the variable frequency exceeds the first predetermined frequency.

In a further arrangement, the predetermined range lies between the first limit and a higher limit, the predetermined frequency-band lies between the first predetermined frequency and a higher frequency and the first frequency comparator is arranged to give the first electrical output signal when the variable frequency exceeds the first predetermined frequency. In such case, the first frequency comparator may give no output signal when the variable frequency is less than the first predetermined frequency.

In a yet further arrangement the predetermined range lies between the first limit and a lower limit, the predetermined frequency-band lies between the first predetermined frequency and a lower frequency, and the first frequency comparator is arranged to give the first electrical output signal when the variable frequency is less than the first predetermined frequency. In such case, the first frequency comparator may give no output signal when the variable frequency exceeds the first predetermined frequency.

The first electrical signal may comprise a signal of the said first predetermined frequency.

The indicator may include detecting means arranged to receive the first electrical output signal and, in response, to transmit a direct-current electrical output signal to the time-interval-responsive means.

According to a third aspect of the invention, there is provided an elapsed-time indicator for measuring the accumulated time for which an electrical input signal of variable frequency lies within a predetermined frequency-band bounded by a first predetermined upper frequency and a second predetermined lower frequency, the indicator including a first frequency comparator arranged to compare the variable frequency with the first predetermined frequency and to give a first electrical output signal when the variable frequency is less than the first predetermined frequency, a second frequency comparator arranged to compare the variable frequency with the second predetermined frequency and to give a second electrical output signal when the variable frequency exceeds the second predetermined frequency, comparison means arranged to give a third electrical output signal only upon simultaneous receipt of the first and second electrical output signals, and time-interval-responsive means responsive to the accumulated time for which the third electrical output signal persists.

According to a fourth aspect of the invention, there is provided an elapsed-time indicator for measuring the accumulated time for which a variable quantity has a magnitude within a predetermined range of magnitudes bounded by an upper limit and a lower limit, the indicator including transducer means for generating an electrical input signal of frequency variable as a function of the magnitude of the variable quantity, such that the variable frequency of the electrical input signal lies between a first predetermined upper frequency and a second predetermined lower frequency as the magnitude of the variable quantity varies between the upper limit and the lower limit and such that the variable frequency is otherwise greater than the first predetermined frequency or less than the second predetermined frequency, a first frequency comparator arranged to compare the variable frequency with the first predetermined fequency and to give a first electrical output signal when the variable frequency is less than the first predetermined frequency, a second frequency comparator arranged to compare the variable frequency with the second predetermined frequency and to give a second electical output signal when the variable frequency exceeds the second predetermined frequency, comparison means arranged to give a third electrical output signal only upon simultaneous receipt of the first and second electrical output signals, and time-interval-responsive means responsive to the accumulated time for which the third electrical output signal persists.

The comparison means may comprise an AND-gate.

Conveniently, the first electrical output signal comprises a signal of the said first predetermined frequency.

Conveniently, the first frequency comparator gives no output signal when the variable frequency exceeds the said first predetermined frequency.

Conveniently, the second electrical output signal comprises a signal of the said second predetermined frequency.

Conveniently, the second frequency comparator gives no output signal when the variable frequency is less than the second predetermined frequency.

The comparison means may be arranged to supply the third electrical output signal in the form of a direct-current electrical output signal.

The indicator may include counting means operated by the electrical output signal supplied to the time-interval-responsive means and arranged to count the number of times the variable frequency of the said electrical input signal passes within the said predetermined frequency-band.

Several embodiments of the invention will now be described by way of example, reference being made to the accompanying drawings of which:

FIGURE 1 shows, in block-diagram form, one form of elapsed-time indicator according to the invention;

FIGURE 2 shows a modification of FIGURE 1;

FIGURE 3 shows a further modification of FIGURE 1; and

FIGURE 4 shows a detail of one form of the indicator of FIGURE 1.

The elapsed-time indicator of FIGURE 1 is arranged to measure the accumulated time for which a variable quantity has a magnitude which is greater than a predetermined limit, and the operation of the indicator is based upon a comparison of the frequency of an electrical input signal of variable frequency, with a predetermined frequency corresponding to the limit.

Referring to FIGURE 1, a signal 1, indicating the magnitude of the variable quantity concerned, is applied to the input of a suitable transducer 2 of which the output is a corresponding electrical input signal of frequency $f$ variable according to the magnitude of the variable quantity. The arrangement is such that, when the magnitude of the variable quantity exceeds the limit, the variable frequency $f$ of the electrical input signal is greater than the predetermined frequency $f_2$, while otherwise the variable frequency $f$ of the electrical input signal is less than the predetermined frequency $f_2$.

The transducer 2 may have any convenient form. In one arrangement, it may be a voltage-controlled oscillator whereof the output frequency is a function, for example a linear function, of the signal 1 which is in the form of a direct-current electrical input signal of which the amplitude represents the magnitude of the variable quantity concerned. In another arrangement, the transducer 2 may be in the fom of a tachogenerator of which the output frequency is a function of the speed of rotation of a shaft.

The variable quantity concerned may be temperature, pressure, frequency, speed, Mach number, rate of flow, degree of illumination, degree of stress, voltage, current, electrical power, mechanical power, weight, height, attitude (angular position), humidity, pH value, sound level, noise level, effective value of $g$ (gravitational constant), or substantially any other measurable phenomenon. A suitable form of transducer 2 will have to be selected in each case.

The electrical input signal, of variable frequency $f$, is applied to one input of a frequency comparator 3 the other input of which is supplied with an electrical signal of the predetermined frequency $f_2$ derived from a voltage-controlled oscillator 4.

The frequency comparator 3 is arranged to give no output signal, unless the variable frequency $f$ exceeds the predetermined frequency $f_2$, when the comparator 3 gives an electrical output signal of the predetermined frequency $f_2$.

The frequency comparator 3 may have any suitable form, but conveniently has the form described in U.S. patent application Ser. No. 425,568 filed on Jan. 14, 1965, and also assigned to Hawker Siddeley Dynamics Limited.

The output of the frequency comparator 3 is supplied to a detector 5 which is arranged to supply an electrical output signal to operate the winding 6 of a relay, only when the detector 5 receives an output signal from the comparator 3.

Operation of the relay results in closure of its normally open relay contacts 7 and 8. Closure of the contact 8 connects a direct-current electrical source 9 to suitable time-interval-responsive means 10 arranged to measure the accumulated time for which electrical current is received from the supply 9.

The time-interval-responsive means 10 may have any suitable form. In one arrangement it may include indicating apparatus comprising a column of mercury interrupted by a space filled with an electrolyte, the arrangement being such that, when the terminals of the source 9 are respectively connected to the two separated parts of the column of mercury, the electrolyte-filled space moves along the column at a rate which is a function of (e.g., proportional to) the accumulated time for which current is allowed to flow from the source 9 to the indicating apparatus; the position of the electrolyte-filled space is read off from a scale 11, and the indicating apparatus is reversible, in that the electrolyte-filled space will move in the relatively opposite direction if, when the space reaches one end of the mercury column, the polarity of the source 9 is reversed: such an indicating apparatus is available commercially as a "Transipack Micron MK 11."

In another arrangement, the time-interval-responsive means 11 may be in the form of a secondary cell (a form of battery) arranged to be charged by the source 9 when the contact 7 is closed, the change of voltage of the secondary cell being a function of (e.g., proportional to) the charging current and the accumulated time for which the charging current is supplied: such a secondary cell is available commercially as a "Texas Solion," and the voltage of the secondary cell may be measured by means of a voltmeter 12 (e.g., a valve voltmeter) having a high input impedance.

In another arrangement, the time-interval-responsive means 10 may include an electrical integrating circuit, of known form, arranged to integrate the current supplied from the source 9. The output of the integrating circuit may be indicated by means of the meter 12, or may be supplied to an electrical recorder 13.

During operation of the arrangement of FIGURE 1, are variable frequency $f$ remains less than the predetermined frequency $f_2$ so long as the magnitude of the variable quantity concerned remains less than the limit: while this condition persists, the frequency comparator 3 gives no output signal and the relay winding 6 remains unenergised, so that the source 9 remains disconnected from the time-interval-responsive means 10.

If, on the other hand, the magnitude of the variable quantity concerned exceeds the limit, then the variable frequency $f$ will exceed the predetermined frequency $f_2$, and the comparator 3 will give an output signal to cause the detector 5 to energise the relay winding 6 and close the contact 7. While this state persists, the source 9 will remain connected to the time-interval-responsive means 10, and the means 10 will respond to the accumulated time for which the state persists: thus, where the indicating apparatus described above is employed, the electrolyte-filled space will move along the scale 11 to indicate the accumulated time, where the secondary cell described above is employed, the voltage of the secondary cell (as measured by the voltmeter 12) will rise in accordance with the accumulated time, and where the electrical integrating circuit is employed, the output of the integrating circuit (as indicated by the meter 12 or as recorded by the recorder 13) will rise in accordance wtih the accumulated time for which the state persists.

The remaining relay contact 8 is arranged, when closed, to connect an electrical source 14 to a counter 15. The arrangement is such that the counter 15 counts the number of times the variable frequency $f$ exceeds the predetermined frequency $f_2$.

The apparatus of FIGURE 2 differs from that of FIGURE 1, in that it is arranged to measure the accumulated time for which a variable quantity has a magnitude which is less than a predetermined limit, the operation of the indicator being based again upon a comparison of the frequency of an electrical input signal of variable frequency $f$, with a predetermined frequency $f_1$ corresponding to the limit.

The electrical input signal of variable frequency $f$ is generated by the transducer 2, from the signal 1, as described above, and is supplied to one input of a frequency comparator 23 similar to the comparator 3 of FIGURE 1. The arrangement is, in this case, such that, when the magnitude of the variable quantity exceeds the limit, the variable frequency $f$ of the electrical input signal is greater than the predetermined frequency $f_1$, while otherwise the variable frequency $f$ is less than the predetermined frequency $f_1$.

The other input of the frequency comparator 23 is supplied with an electrical signal of the predetermined frequency $f_1$, derived from a voltage-controlled oscillator 24.

The frequency comparator 23 is, in this case, arranged to give no output signal, unless the variable frequency $f$ is less than the predetermined frequency $f_1$, when the comparator 23 gives an electrical output signal of the predetermined frequency $f_1$.

The remainder of the apparatus of FIGURE 2 is similar to that of FIGURE 1, and has therefore been shown with the same reference numerals.

During operation of the arrangement of FIGURE 2, the variable frequency $f$ remains greater than the predetermined frequency $f_1$ so long as the magnitude of the variable quantity concerned remains greater than the limit: while this condition persists, the frequency comparator 23 gives no output signal and, as before, the time-interval-responsive means 10 remains disconnected from the source 9.

If, on the other hand, the magnitude of the variable quantity concerned becomes less than the limit, then the variable frequency $f$ will become less than the predetermined frequency $f_1$, and the comparator 23 will give an output signal to cause the detector 5 to energise the relay winding 6 and close the contact 7, thus connecting the source 9 to the time-interval-responsive means 10. The means 10 will respond to the accumulated time for which this state persists, as described above.

In the arrangement of FIGURE 2, the counter 15 is arranged to count the number of times the variable frequency $f$ becomes less than the predetermined frequency $f_1$.

The apparatus of FIGURE 3 differs from that of FIGURE 1, in that it is arranged to measure the accumulated time for which a variable quantity has a magnitude which lies between an upper limit and a lower limit, the operation of the indicator being based upon a comparison of the frequency of an electrical input signal of variable frequency $f$, with a predetermined upper frequency $f_2$ corresponding to the upper limit and with a predetermined lower frequency $f_1$ corresponding to the lower limit.

The electrical input signal of variable frequency $f$ is generated by the transducer 2, from the signal 1, as described above, and is supplied to one input of a first frequency comparator 33 and to one input of a second frequency comparator 43, the comparators 33 and 43 being similar to the comparators 3 and 23.

The arrangement is, in this case, such that when the magnitude of the variable quantity concerned lies between the upper limit and the lower limit, the variable frequency $f$ lies between the predetermined upper frequency $f_2$ and the predetermined lower frequency $f_1$. If the magnitude of the variable quantity exceeds the upper limit, then the variable frequency $f$ exceeds the predetermined upper frequency $f_2$, while if the magnitude of the variable quantity is less than the lower limit, then the variable frequency $f$ is less than the predetermined lower frequency $f_1$.

The other input of the first frequency comparator 33 is supplied with an electrical signal of the predetermined upper frequency $f_2$, derived from a voltage-controlled oscillator 34.

The first frequency comparator 33 is arranged to give no output signal, unless the variable frequency $f$ is less than the first predetermined upper frequency $f_2$, when the comparator 33 gives a first electrical output signal of the predetermined upper frequency $f_2$.

The other input of the second frequency comparator 43 is supplied with an electrical signal of the predetermined lower frequency $f_1$, derived from a voltage-controlled oscillator 44.

The second frequency comparator 43 is arranged to give no output signal, unless the variable frequency $f$ exceeds the predetermined lower frequency $f_1$, when the comparator 43 gives a second electrical output signal of the predetermined lower frequency $f_1$.

The outputs of the comparators 33 and 43 are respectively supplied to the two inputs of an AND-gate 25 which is arranged to supply an electrical output signal to the relay winding 6, to operate the relay, only when the AND-gate 25 simultaneously receives both the first electrical output signal from the comparator 33 and the second electrical output signal from the comparator 43.

The arrangement of FIGURE 3 is otherwise similar to that of FIGURE 1, as described above, and corresponding elements have therefore been marked with the same reference numerals.

During operation of the arrangement of FIGURE 3, the variable frequency $f$ remains greater than the predetermined upper frequency $f_2$ so long as the magnitude of the variable quantity concerned remains greater than the upper limit: under these conditions, the comparator 33 gives no output signal, so that the AND-gate 25 also gives no output signal, and therefore the time-interval-responsive means 10 remains disconnected from the source 9.

Also, the variable frequency $f$ remains less than the predetermined lower frequency $f_1$ so long as the magnitude of the variable quantity concerned remains less than the lower limit: under these conditions, the comparator 43 gives no output signal and, as in the preceding paragraph, the time-interval-responsive means 10 remains disconnected from the source 9.

If, on the other hand, the magnitude of the variable quantity concerned lies between the upper limit and the lower limit, then the variable frequency $f$ will lie between the predetermined upper frequency $f_2$ and the predetermined lower frequency $f_1$: under these conditions, both of the comparators 33 and 43 will give an output signal, and the AND-gate 25 will therefore supply an electrical output signal to energise the relay winding 6 and operate the relay. The resulting closure of the contact 7 will, as described above, connect the source 9 to the time-interval-responsive means 10. The means 10 will respond to the accumulated time for which this state persists, as described above.

In the arrangement of FIGURE 3, the counter 15 is arranged to count the number of times the variable frequency $f$ falls within the frequency-band bounded by the frequencies $f_2$ and $f_1$.

The apparatus of FIGURE 3 may be arranged in any of the various ways described with reference to FIGURE 1, but is particularly applicable to the measurement of the accumulated time for which the frequency of rotation of an aircraft propeller lies within a predetermined frequency-band. Difficulties are experienced with propeller vibration at certain frequencies of rotation of aircraft propellers, and it is important to record the accumulated time for which such a propeller has been subject to such vibration, in order to calculate the life of the propeller. In such case, the apparatus of FIGURE 3 may have the form indicated in FIGURE 4, wherein the transducer 2 of FIGURE 3 has the form of a tachogenerator 28 driven by a shaft 29 from the propeller 30, the output of the tachogenerator 28 being the electrical input signal of frequency $f$ variable according to the frequency of rotation of the shaft 29 and of the propeller 30.

We claim:

1. An elapsed-time indicator for measuring the accumulated time for which an electrical input signal of variable frequency lies within a predetermined frequency-band bounded by a predetermined upper frequency and a predetermined lower frequency, the indicator including a first frequency comparator arranged to compare the variable frequency with said predetermined upper frequency and to give a first electrical output signal only when said variable frequency is less than said predetermined upper frequency, a second frequency comparator arranged to compare said variable frequency with the said predetermined lower frequency and to give a second electrical output signal only when said variable frequency exceeds said predetermined lower frequency, coincidence means supplied with said first and second electrical output signals and arranged to give a third electrical output signal only upon simultaneous receipt of said first and second electrical output signals, and time-interval-responsive means supplied with said third electrical output signal and responsive to the accumulated time for which said third electrical output signal persists.

2. An indicator according to claim 1, wherein said coincidence means comprises an AND-gate.

3. An indicator according to claim 1, wherein said first frequency comparator is so arranged that said first electrical output signal comprises a signal of the said predetermined upper frequency.

4. An indicator according to claim 3, wherein said first frequency comparator is so arranged that it gives no output signal when said variable frequency exceeds the said predetermined upper frequency.

5. An indicator according to claim 1, wherein said second frequency comparator is so arranged that said second electrical output signal comprises a signal of the said predetermined lower frequency.

6. An indicator according to claim 5, wherein said second frequency comparator is so arranged that it gives no output signal when said variable frequency is less than said predetermined lower frequency.

7. An indicator according to claim 1, wherein said coincidence means is arranged to supply said third electrical output signal in the form of a direct-current electrical output signal.

8. An indicator according to claim 7, wherein said time-interval-responsive means includes an indicating apparatus arranged to receive the direct-current electrical output signal, the indicating apparatus comprising a column of mercury interrupted by a space filled with an electrolyte, the rate of movement of the space along the column being a function of the accumulated time for which the direct-current electrical output signal persists.

9. An indicator according to claim 7, wherein said time-interval-responsive means includes a secondary cell arranged to be charged by the direct-current electrical output signal and means for observing the change of voltage of the secondary cell, the change of voltage of the secondary cell being a function of the accumulated time for which the direct-current electrical output signal persists.

10. An indicator according to claim 9, wherein the means for observing the change of voltage of the secondary cell comprises a voltmeter of high input impedance.

11. An indicator according to claim 1, wherein said time-interval-responsive means includes an electrical integrating circuit arranged to integrate said third electrical output signal.

12. An indicator according to claim 11, wherein said time-interval-responsive means includes an electrical meter supplied with the output of said electrical integrating circuit and arranged to indicate the accumulated time for which said third electrical output signal persists.

13. An indicator according to claim 11, wherein said time-interval-responsive means includes an electrical recorder supplied with the output of said electrical integrating circuit and arranged to record the accumulated time for which said third electrical output signal persists.

14. An elapsed-time indicator for measuring the accumulated time for which a variable quantity has a magnitude within a predetermined range of magnitudes bounded by an upper limit and a lower limit, the indicator including transducer means for generating an electrical input signal of frequency variable as a function of said magnitude of said variable quantity, said transducer means being so selected that said variable frequency always and only lies between a predetermined upper frequency and a predetermined lower frequency when said magnitude of said variable quantity lies between said upper limit and said lower limit, a first, frequency comparator arranged to compare said variable frequency with said predetermined upper frequency and to give a first electrical output signal only when said variable frequency is less than said predetermined upper frequency, a second frequency comparator arranged to compare said variable frequency with said predetermined lower frequency and to give a second electrical output signal only when said variable frequency exceeds said predetermined lower frequency, coincdence means supplied with said first and second electrical output signals and arranged to give a third electrical output signal only upon simultaneous receipt of said first and second electrical output signals, and time-interval-responsive means supplied with said third electrical output signal and responsive to the accumulated time for which the third electrical output signal persists.

15. An indicator according to claim 14, wherein said transducer means includes a voltage-controlled oscillator whereof the output frequency comprises the said variable frequency and is a function of a direct-current electrical input signal representing the magnitude of the said variable quantity.

16. An indicator according to claim 14, in combination with a rotatable shaft, said transducer means being operably connected to said shaft whereby said variable frequency is a function of the speed of rotation of said shaft.

17. An indicator according to claim 16, wherein said transducer means comprises a tachogenerator.

References Cited

UNITED STATES PATENTS

| | | | |
|---|---|---|---|
| 2,104,801 | 1/1938 | Hansell | 324—78 XR |
| 2,439,872 | 4/1948 | Sanders | 328—141 |
| 2,919,403 | 12/1959 | Buntenbach | 324—79 |
| 2,946,646 | 7/1960 | Bower et al. | |
| 3,056,922 | 10/1962 | DuVall et al. | 324—68 |
| 3,084,307 | 4/1963 | Landis | 324—79 |
| 3,193,798 | 7/1965 | Palmer | 324—68 XR |
| 3,207,995 | 9/1965 | Beer et al. | |

RUDOLPH V. ROLINEC, *Primary Examiner.*

WALTER L. CARLSON, P. F. WILLE, *Examiners.*